US012554761B2

(12) United States Patent
Brenna et al.

(10) Patent No.: US 12,554,761 B2
(45) Date of Patent: Feb. 17, 2026

(54) DATA SOURCE CURATION FOR LARGE LANGUAGE MODEL (LLM) PROMPTS

(71) Applicant: Microsoft Technology Licensing, LLC, Redmond, WA (US)

(72) Inventors: Lars Brenna, Tromso (NO); Yaw Oduro Amoateng, Redmond, WA (US); Zoran Hranj, Oslo (NO)

(73) Assignee: Microsoft Technology Licensing, LLC., Redmond, WA (US)

( * ) Notice: Subject to any disclaimer, the term of this patent is extended or adjusted under 35 U.S.C. 154(b) by 208 days.

(21) Appl. No.: 18/468,679

(22) Filed: Sep. 15, 2023

(65) Prior Publication Data
US 2025/0094471 A1    Mar. 20, 2025

(51) Int. Cl.
*G06F 16/34*    (2025.01)
*G06F 3/0482*    (2013.01)
*G06F 16/335*    (2019.01)
*G06F 40/40*    (2020.01)

(52) U.S. Cl.
CPC .......... *G06F 16/345* (2019.01); *G06F 3/0482* (2013.01); *G06F 16/337* (2019.01); *G06F 40/40* (2020.01)

(58) Field of Classification Search
None
See application file for complete search history.

(56) References Cited

U.S. PATENT DOCUMENTS

| 9,275,151 | B2 | 3/2016 | Ghosh | |
| 10,902,011 | B1* | 1/2021 | Stotts | G06F 16/24568 |
| 11,386,508 | B2 | 7/2022 | Excoffier | |
| 2006/0136244 | A1* | 6/2006 | DeFolo | G06Q 10/10 705/7.37 |
| 2017/0316080 | A1 | 11/2017 | Brisebois et al. | |
| 2019/0163734 | A1* | 5/2019 | Gaber | G06F 40/18 |

(Continued)

FOREIGN PATENT DOCUMENTS

IN    201821031851 A    2/2020

OTHER PUBLICATIONS

Azzam, et al., "A Model for Generating a User Dynamic Profile on Social Media", In Journal of King Saud University—Computer and Information Sciences, Nov. 1, 2022, pp. 9132-9145.

(Continued)

*Primary Examiner* — Quynh H Nguyen
(74) *Attorney, Agent, or Firm* — Foley IP Law, PLLC

(57) ABSTRACT

Data source curation for large language model (LLM, generically multimodal model) prompts enables compliance with privacy requirements, while allowing for personal preferences, when Generated passages relating to a person import information from external data sources. A set of data sources is presented to a user, permitting the user to select which to use or avoid using. In some examples, when a user adds a data source, based on the nature of the data source, the user is provided a prompt to provide consent for the use of the content of that data source, enabling user-directed curation of the data sources used in the LLM generation of a summary about the person. In some examples, the set of data sources presented to a user had been previously curated according to governing policies, to restrict the user from accepting use of a data source that is disfavored for legal or policy reasons.

18 Claims, 10 Drawing Sheets

(56) References Cited

U.S. PATENT DOCUMENTS

| | | | |
|---|---|---|---|
| 2020/0204643 A1 | 6/2020 | Zhou et al. | |
| 2021/0141820 A1 | 5/2021 | Vora | |
| 2021/0360085 A1* | 11/2021 | Selegean | G06F 8/65 |
| 2023/0224540 A1 | 7/2023 | Kodali et al. | |
| 2025/0061279 A1* | 2/2025 | deLevie | G06F 40/131 |

OTHER PUBLICATIONS

B., Jeni, "From Boring to Bold: How LinkedIn's AI Boosts Your Professional Profile", Retrieved From: https://www.linkedin.com/pulse/from-boring-bold-how-linkedins-ai-boosts-your-profile-jeni-b-/, Mar. 24, 2023, 7 Pages.

Iglesias, et al., "Creating Evolving User Behavior Profiles Automatically", In Journal of IEEE transactions on knowledge and data engineering, vol. 24, Issue 5, May 2012, pp. 854-867.

International Search Report Received in PCT Application No. PCT/US2024/043784, mailed on Nov. 18, 2024, 13 pages.

\* cited by examiner

DATA SOURCE CURATION FOR LARGE LANGUAGE MODEL (LLM) PROMPTS

BACKGROUND

Large language models (LLMs) are used to generate summary passages of various data sets and combinations of data sets. However, when the summary passage pertains to a human data subject, some issues arise, including privacy rules and personal preferences of the data subject regarding which audience sees what information. For example, in a large system that spans multiple legal jurisdictions, the inclusion of certain data sources in the LLM prompt may vary from being legally permissible to impermissible, even while the personal preferences of the data subjects may vary widely and sometimes independently of the legal permissions. Additionally, legal requirements and personal preferences vary over time. These factors render governance of the use of LLM to generate people summaries highly challenging.

SUMMARY

The disclosed examples are described in detail below with reference to the accompanying drawing figures listed below. The following summary is provided to illustrate some examples disclosed herein.

Example solutions for data source curation for multimodal model (e.g., large language model (LLM)) prompts include: presenting, in a user interface (UI), a set of data source identifications and a set of data source selections, each data source selection of the set of data source selections corresponding to a respective data source identification of the set of data source identifications, the set of data source selections indicating whether to use a data source identified by the corresponding data source identification; detecting, through the UI, changes to the set of data source selections; detecting an approval, through the UI, to generate a generated passage using the set of data source selections; persisting the set of data source selections and a record of the approval; based on at least detecting the approval, generating the generated passage using each data source identified as to be used in the set of data source selections; and displaying, in the UI, the generated passage.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
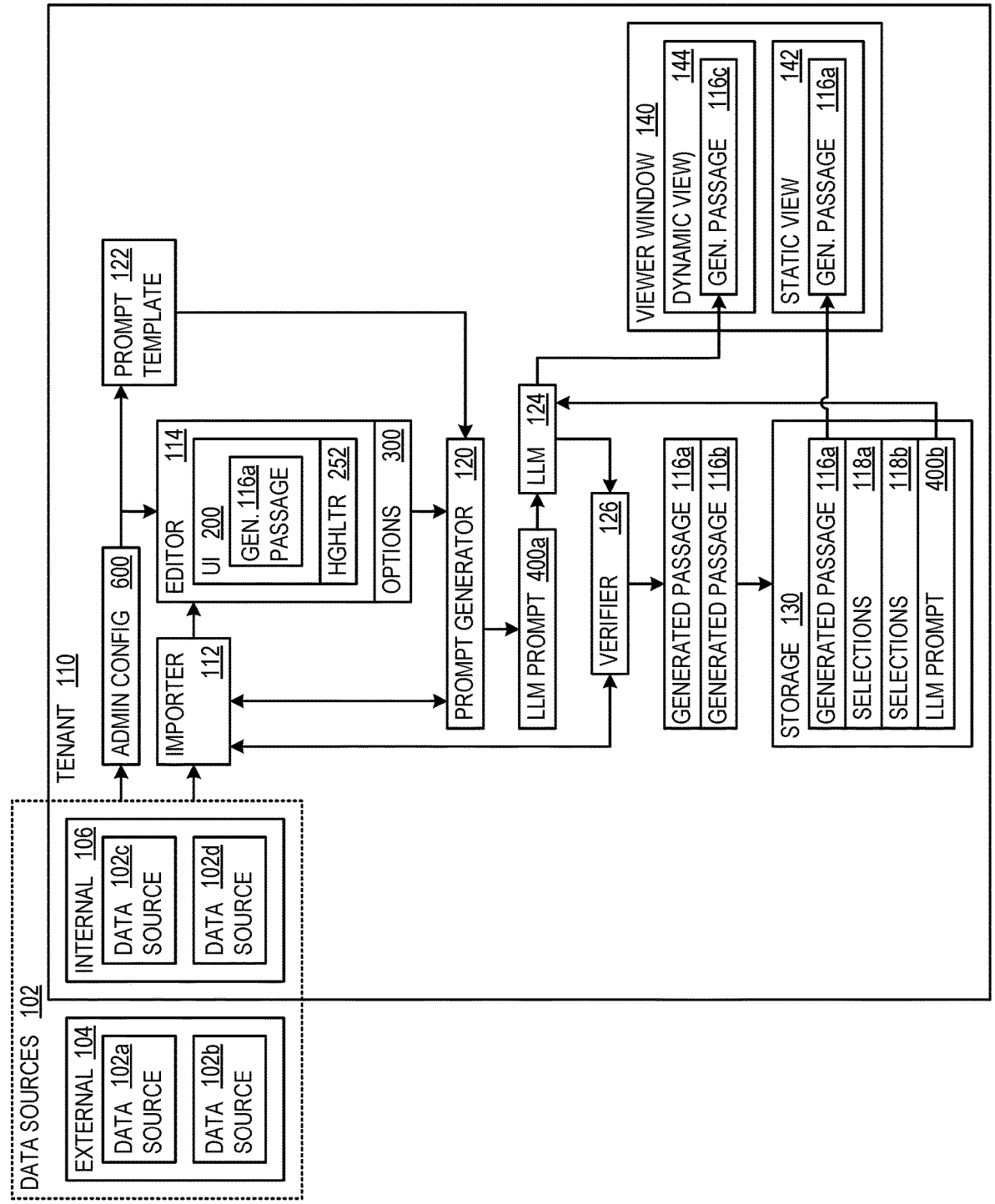
FIG. 1 illustrates an example architecture that advantageously curates data sources for multimodal model (e.g., large language model (LLM)) prompts.

Data source curation for multimodal model (MM, e.g., large language model (LLM)) prompts enables compliance with privacy requirements, while allowing for personal preferences, when generated passages (e.g., LLM-generated or generically, MM-generated) relating to a person import information from external data sources. A set of data sources is presented to a user, permitting the user to select which to use or avoid using. In some examples, when a user adds a data source, based on the nature of the data source, the user is provided a prompt to provide consent for the use of the content of that data source, enabling user-directed curation of the data sources used in the MM generation of a summary about the person. In some examples, the set of data sources presented to a user had been previously curated according to governing policies, to restrict the user from accepting use of a data source that is disfavored for legal or policy reasons. In some examples, records of user consent are stored during the data source curation process, in order to comply with privacy requirements in some legal jurisdictions.

Aspects of the disclosure enhance data security and privacy, as well as reducing bandwidth for queries-even while permitting MMs to generate data using up-to-date data sources, thereby providing a practical, useful result to solve technical problems in the domain of computing. This is accomplished, at least in part, by permitting user curation of data sources, some of which may be updated after the curation process, so that when the MM generates the passage for a viewer, in some examples, current information is used, but only based upon the permission that had been provided by of a human data subject.

Aspects of the disclosure provide for less memory usage, reduced processing load, and reduced bandwidth and computing resource usage at least by reducing repeated manual changes of profiles, saving or freeing up available network bandwidth and computing resources and thereby improving the functioning of the underlying device. Aspects of the disclosure further enhance compliance with privacy and security requirements for personal user data by automatically generating compliant profiles (people summaries), further reducing bandwidth usage for compliance checks on generated profiles. Updates may be implemented dynamically in response to changes, governance and tenant policies providing restrictions in the options for creating profiles, preventing generation of non-compliant profiles, improving user interaction between a user and the computing device. Aspects of the disclosure provide for tailoring dynamically generated profiles based on audiences (viewer classes) as well as compliance parameters, and displaying the dynamically generated profiles to a user in a user interface for transparency and explainability of the MM-generated data, thereby improving user interaction between the user and the device.

Aspects of the disclosure enable MM generation of personal summaries from disparate data sources to be compliant with privacy and security requirements, even when tenants span multiple legal jurisdictions. Curating data sources, which selects the best or most appropriate for use, enables users, such as the data subjects of personal summaries to control how an artificial intelligence (AI) model, such as an LLM, generates passages that are visible to other viewers. A UI permits a user to see, in real time, how adding or removing a data source changes generated passages. Some examples highlight differences for with/without a particular data source. Examples are described herein for an LLM, but may be generalized to MMs (which include LLMs) and other machine learning (ML) models.

Users are able to select and experiment with different data sources, such as meeting and document activity, communications such as recent emails, profile data, tone and style, and other personal data, such as formality and pronouns, to dynamically update and customize their personal summaries. Some examples permit different selections for different viewing audiences, static or dynamic passages, and contextual summaries versus non-contextual summaries.

Contextual people summaries are generated for and are private to a particular viewer or defined set of viewers. The data sources used may include input data that is shared among the data subject and a defined set of viewers, such as non-public documents, communications and other tenant-proprietary data. Context may be based on shared activities such as collaborations or projects, or on meetings. Some contextual people summaries are generated in real-time, on demand (dynamically), rather than persisted (with the exception of caching for a relatively short time period). In some scenarios, if a data subject is involved with multiple different projects or groups of people, there may be a wide variety of different contexts and thus a large number of differing contextual summaries. In such scenarios, it may be preferable for the data subject to approve data sources by type (e.g., emails, documents), rather than needing to approve every specific contextual summary. The selections (curations) of the data sources by type is persisted, so that the passages may be generated on an as-needed basis.

Non-contextual people summaries are those that are shown to all viewers for whom a contextual summary is not warranted, such as an unknown or generic viewer. Due to practical considerations, such as the general need for contextual summaries to have up-to-date information, non-contextual summaries are more likely to be static than are contextual summaries, although some non-contextual summaries may be dynamic, and some contextual summaries may be static (rather than dynamic). Static summaries may be edited, after LLM generation, prior to persistence.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

FIG. 1 illustrates an example architecture 100 that advantageously curates data sources for Generated passages, such as people summaries. A set of data sources 102 includes data sources 102a-102d. Data source 102a and data source 102b are external data sources 104 that are external to a tenant 110, such as possibly pulled in from publicly-available social media websites. Data source 102c and data source 102d are internal data sources 106 that are internal to tenant 110, such as possibly pulled in from email accounts, document management systems, or other proprietary sources. As used herein, a tenant is a boundary around configuration and data, representing rights to access the internal tenant data.

A data importer retrieves and, if necessary, coverts data from the format of the individual ones of data sources 102 to what is needed for use within architecture 100 (e.g., for use by a prompt generator 120, which is described below). An administrative configuration tool 600 generates an LLM prompt template 122 and configures an editor 114 that is used by a user (e.g., a data subject 230 of FIG. 2A) during data source curation. Administrative configuration tool 600 is shown and described in further detail in relation to FIG. 6.

Figure 2A:
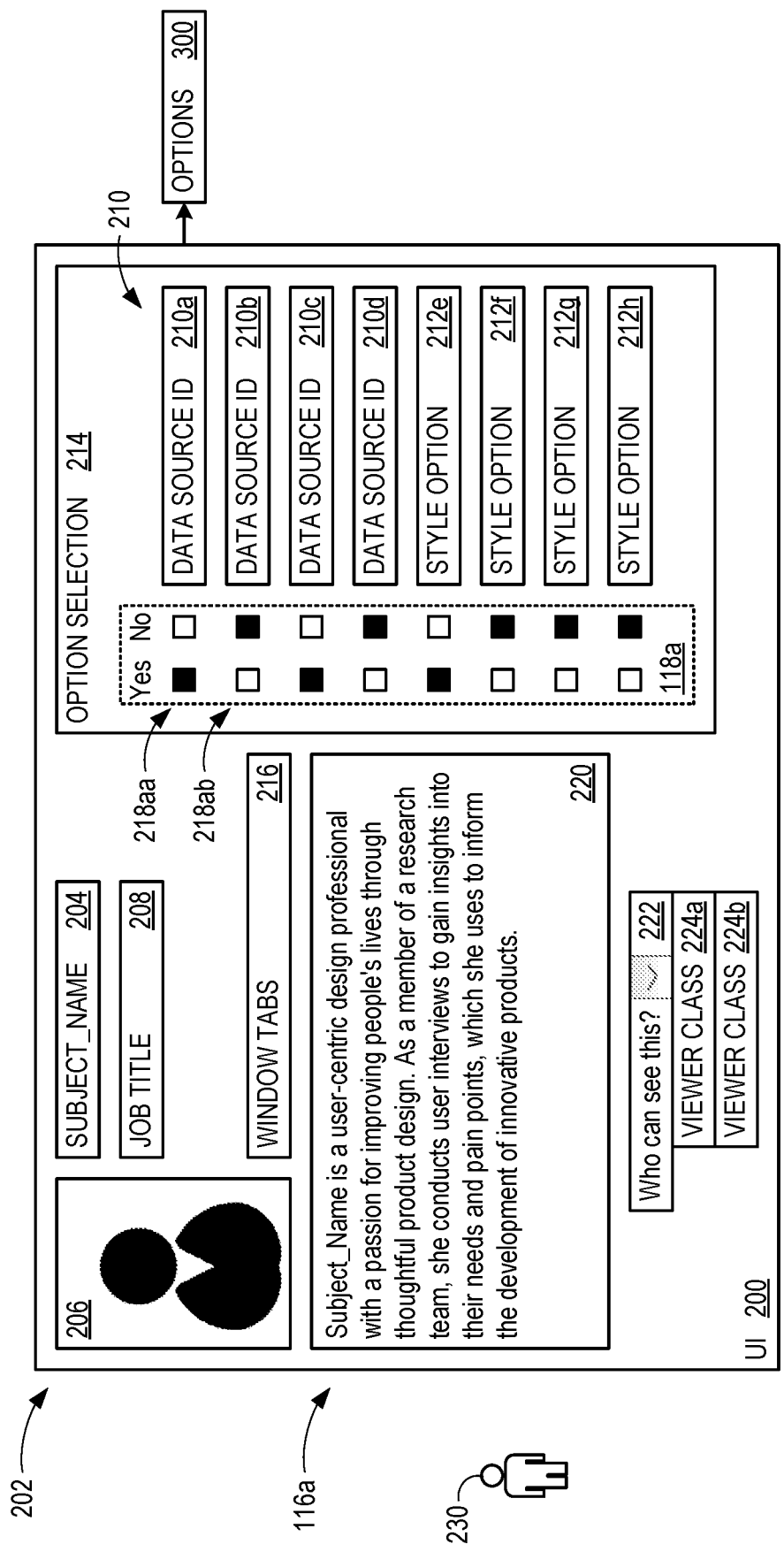
FIGS. 2A and 2B illustrate an exemplary user interface (UI) employed by a user during data source curation, when using examples of the architecture of FIG. 1.
Figure 2B:
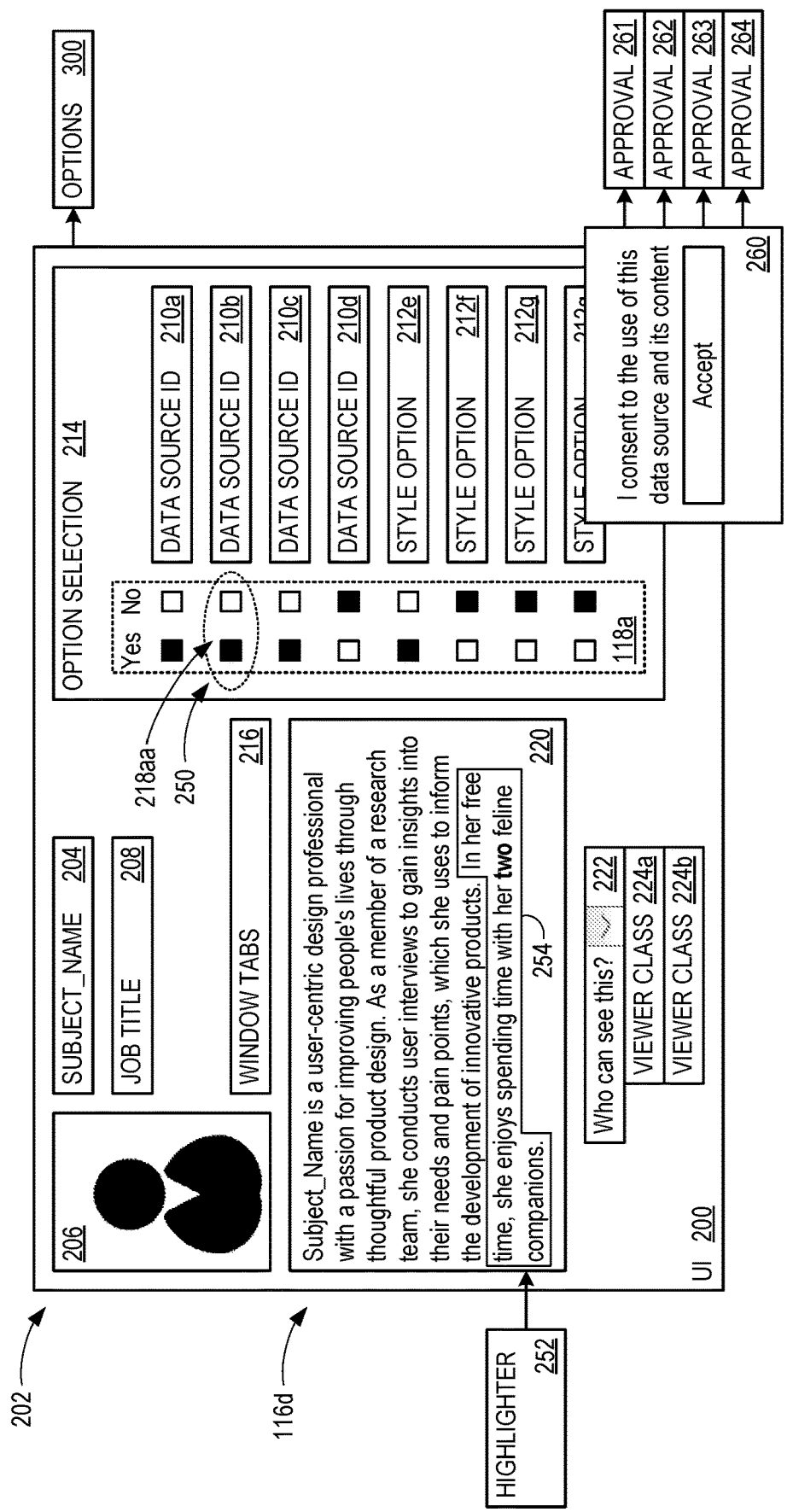

Editor 114 provides a UI 200 that is shown and described in further detail in relation to FIGS. 2A and 2B. UI 200 displays, among other things, a generated passage 116a and other generated passages. Some examples include a highlighter 252 that highlights changes that occur when a new data source is added or removed. Highlighter 252 is shown and described in further detail in relation to FIG. 2B. Editor 114 edits and persists data curation options 300, which are shown and described in further detail in relation to FIG. 3.

A prompt generator 120 intakes data from selected ones of data sources 102 (identified within data curation options 300) and possibly converted by importer 112, along with LLM prompt template 122, to generate an LLM prompt, such as LLM prompt 400a. LLM prompt 400a is provided to LLM 124 to generate generated passage 116a. Another LLM prompt 400b (described below) is provided to LLM 124 to generate generated passage 116b. LLM prompt 400a is shown and described in further detail in relation to FIG. 4; other LLM prompts are similar.

In some examples, generated passage 116a, generated passage 116b, and other generated passages are generated using another technique, such as using another model relevant to language processing or natural language processing (NLP). Generated passages, such as generated passages 116a and 116b are passed through a verifier 126, which may compare the Generated passages with data from the selected ones of data sources 102 (possibly converted by importer 112) to identify and correct potential AI hallucination.

In this illustrated example, generated passage 116a is static, and so is persisted in a storage 130, along with a set of data source selections 118a (from data curation options 300) that was used to generate LLM prompt 400a. Generated passage 116a is persisted so that it may be retrieved by a viewer window 140 for a static view 142. Set of data source selections 118a is persisted so that the user (data subject 230) may edit set of data source selections 118a starting from the prior saved version.

In this illustrated example, generated passage 116b is dynamic, and so is not persisted in a storage 130, but instead set of data source selections 118b (from data curation options 300) that was used to generate LLM prompt 400b, is persisted. In some examples, some or all of LLM prompt 400b is also persisted in storage 130 to save time. Storage 130 represents any storage available to architecture 100, and may be distributed, rather than a single storage location. When a viewer attempts to view dynamic generated passage 116b, a more current version, generated passage 116c, is dynamically generated, using the up-to-date (current) data within the selected ones of data sources 102, and generated passage 116c is displayed in viewer window 140 for a dynamic view 144. In some examples, generated passage 116c is also passed through verifier 126.

FIG. 2A illustrates further detail for UI 200. Data subject 230 uses UI 200 to curate data sources 102 and save sets of data source selections (e.g., set of data source selections 118a and also set of data source selections 118b) in data curation options 300. Subject overview 202 includes a name 204 of data subject 230 (shown as "Subject_Name"), a photograph 206 or avatar, and a job title 208. A set of window tabs 216 may include overview, contact, organization, and feed tabs that enable further customization.

In FIG. 2A, a preview pane 220 is currently displaying generated passage 116a. A viewer class selection window 222 permits data subject 230 to separately select options, including curating data sources 102 differently for different intended audiences, such as members of the public, subordinates, supervisors, and colleagues within tenant 110, but in a different work relationship than supervisors or subordinates. Two viewer classes are shown, a viewer class 224a, for generated passage 116a, and a viewer class 224b, for generated passage 116b (which will actually be generated passage 116c, at the time of display). Viewer class selection window 222 is illustrated as a drop-down menu, but other configurations are also possible. In some examples, data subject 230 is permitted to define a viewer class, such as using UI 200, whereas in some examples, viewer classes are defined using administrative configuration tool 600. In some examples, preview pane 220 doubles as an editor for static Generated passages, such as generated passage 116a.

An options selection pane 214 displays a set of data source identifications 210 that has a data source identifications 210a-210d. Data source identification 210a identifies data source 102a; data source identification 210b identifies data source 102b; data source identification 210c identifies data source 102c; and data source identification 210d identifies data source 102d. Set of data source selections 118a corresponds to individual ones of set of data source identifications 210, for example, data source selection 218aa corresponds to data source identification 210a and data source selection 218ab corresponds to data source identification 210b. Identifying the other correspondences from FIG. 2A is straightforward.

Set of data source selections 118a is illustrated as a set of "Yes/No" radio buttons, but other configurations are also possible. In the illustrated example, based on the settings of data source selections 118a, data source 102a and data source 102c will be used for generated passage 116a, but data source 102c and data source 102d will not be used for generated passage 116a. Style options 212e-212h represent various style and tone options, such as formality (e.g., use first and last name or just first name), using specified pronouns, performing automatic language translation, and other style options as provided for by administrative configuration tool 600. Set of data source selections 118b (not shown) may be set differently, and is used for generated passage 116b. Each viewer classes may have its own set of data source selections, to produce Generated passages specific to that viewer class.

FIG. 2B is similar to FIG. 2A, although there is a change 250 to data source selection 218ab, from "No" to "Yes". This adds data source 102b. As a result generated passage 116a (which is the prior generated passage, prior to change 250), becomes new generated passage 116d. Based on latency times and workload of architecture 100, new generated passage 116d may be displayed automatically upon change 250, without requiring further action by data subject 230, or data subject 230 may need to click a "Regenerate" button or other similar trigger button.

Highlighter 252 notes a difference, between prior generated passage 116a and new generated passage 116d, with a highlighting 254 (which may be a background color, bold font or other visual or audio emphasis). The illustrated difference is the addition of a sentence stating. "In her free time, she enjoys go-cart racing and spending time with her two feline companions." Data source 102b may be a social media website that includes information about the pets cared for by data subject 230.

Figure 5:
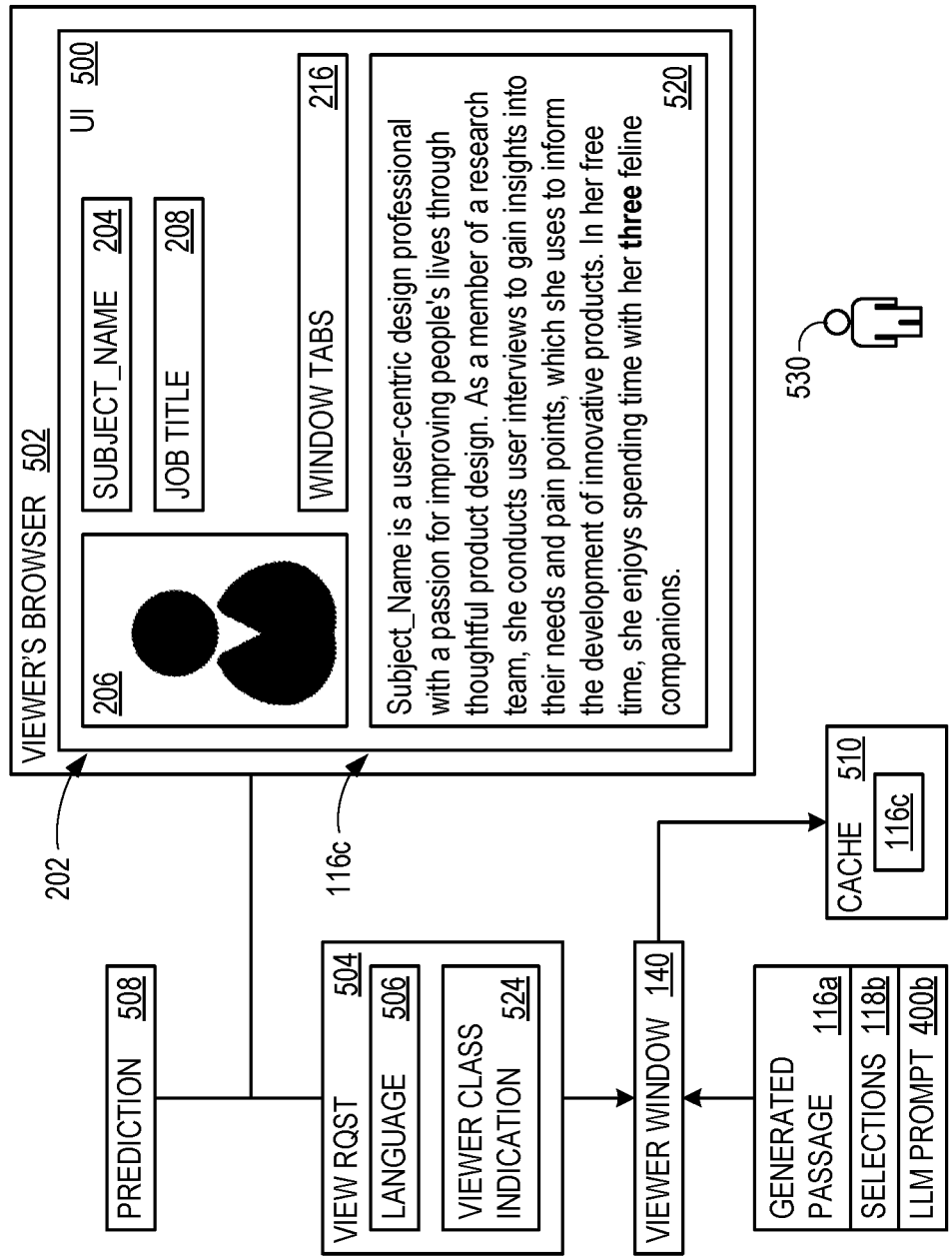
FIG. 5 illustrates an exemplary UI as seen by a viewer, who views generated passages after data source curation with examples of the architecture of FIG. 1.

The word "two" is in bold in FIG. 2B (although it may not be in UI 200), to illustrate the dynamic nature of some Generated passages. If data source 102b is used in a dynamic Generated passage, such as generated passage 116b, then at the time that generated passage 116c is displayed, if data source 102b has information about a different number of cats, this different number will be reflected in generated passage 116c. This is illustrated in FIG. 5, where generated passage 116c refers to "three feline companions."

In some examples, adding a new data source results in the immediate appearance of a user approval prompt 260 that is specific to the new data source use. When data subject 230 approves the use of data source 102b, such as by clicking the "Accept" button, an approval 261 is noted. Approvals may be for specific data sources, sets of data source selections, and/or generated passages. For example, approval 261 may be specific to data source 102b or set of data source selections 118a, whereas an approval 262 may be specific to generated passage 116a (possibly after editing). An approval 263 may be specific to a data source, whereas an approval 264 may be specific to set of data source selections 118b (since generated passage 116b is dynamic and may not be shown with its exact same content when viewed by a viewer).

Figure 3:
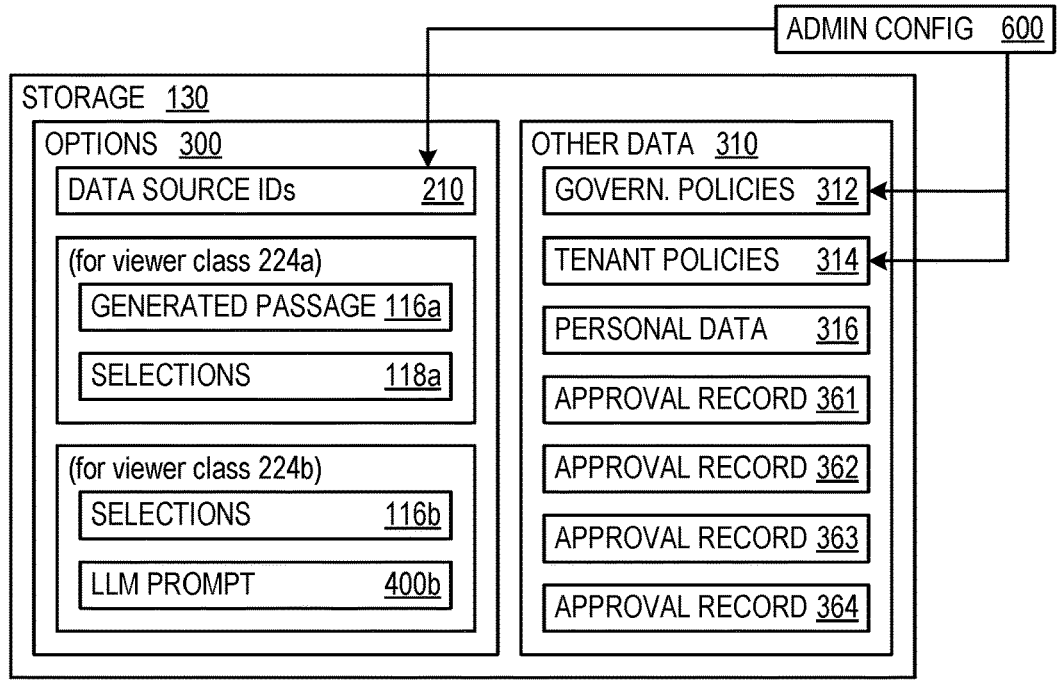
FIG. 3 illustrates exemplary data sets created and used by examples of the architecture of FIG. 1.

FIG. 3 shows various exemplary data sets stored within storage 130, which represents storage generally, and should not be construed to necessarily be a single monolithic storage solution. Data curation options 300 includes set of data source identifications 210, which may be defined by administrative configuration tool 600, as shown and described below in relation to FIG. 6. Data curation options 300 also includes generated passage 116a, set of data source selections 118a, set of data source selections 118b, and LLM prompt 400b. LLM prompt 400b may be used in the event that a data source, identified in set of data source selections 118b as to be used, is unavailable, preventing the generation of a new LLM prompt for generated passage 116c.

Other data 310 is also used, in some examples. For example, administrative configuration tool 600 permits specification of governance policies 312, such as local rules and laws (e.g., based on the general data protection regulations (GDPR) or others), and tenant policies 314 that may further restrict use of data sources even beyond governance policies 312, or have other impacts on what is required or allowed in UI 200.

Personal data 316 may include pronouns and/or a writing style sample for LLM 124 to mimic (if specified in a style option). A record 361 is an approval record of approval 261; a record 362 is an approval record of approval 262; a record 363 is an approval record of approval 263; and a record 364 is an approval record of approval 264. Records 361-364 may be used in the event of a privacy compliance audit of tenant 110, to prove that the required consent had been obtained from data subject 230 for Generated passages produced by architecture 100.

Figure 4:
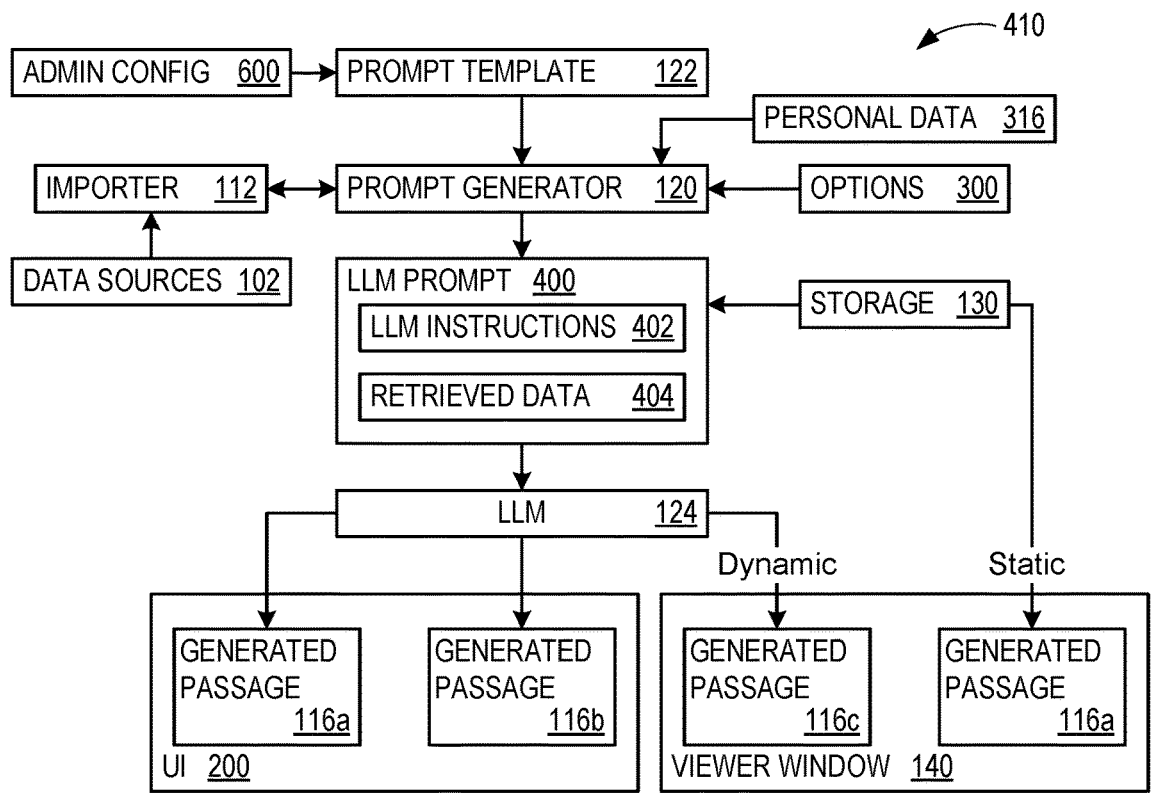
FIG. 4 illustrates an exemplary workflow involved with generating and using LLM prompts in examples of the architecture of FIG. 1.

FIG. 4 illustrates an exemplary workflow 410 involved with generating and an LLM prompt 400, which represents either LLM prompt 400a or LLM prompt 400b in various scenarios. As described in further detail in relation to FIG. 6, administrative configuration tool 600 generates LLM prompt template 122. Importer 112 imports (retrieves and coverts, if necessary) data from selected ones of data sources 102. Prompt generator 120 uses LLM prompt template 122, data from importer 112, data curation options 300, and personal data 316 to produce LLM prompt 400. LLM prompt 400 has LLM instructions 402 (e.g., style and tone options, LLM parameters) and data 404 retrieved from each selected one of data sources 102.

LLM prompt 400 is provided to LLM 124, which generates passages at various times. LLM 124 produces generated passage 116a for UI 200 using set of data source selections 118a and produces generated passage 116b for UI 200 using set of data source selections 118b. LLM 124 produces generated passage 116c (and other dynamic generated passages) for viewer window 140 using set of data source selections 118b, but at a later time than generated passage 116b, when some of data sources 102 may have updated information. LLM 124 does not produce generated passage 116a (or other static generated passages) for viewer window 140), but instead, generated passage 116a (and other static generated passages) are retrieved from storage 130.

FIG. 5 illustrates an exemplary UI 500 as seen by a viewer 530, who views generated passage 116a or generated passage 116c. Generated passage 116c is shown in a display pane 520 with "three felines" rather than "two felines" because, in this illustrated scenario, data subject 230 updated data source 102b to indicate the arrival of a new cat. UI 500 may appear similar to UI 200, for example, with subject overview 202 including name 204, photograph 206 (or avatar), job title 208, and set of window tabs 216.

UI 500 may appear within an internet browser 502 of viewer 530, which sends a viewing request 504 to viewer window 140. In some examples, viewing request 504 includes a language 506 for automatic translation functionality, and a viewer class indication 524 that permits viewer window 140 to select from generated passages 116a and 116c. As described previously, viewer window 140 either retrieves generated passage 116a from storage 130, or retrieves set of data source selections 118b (or LLM prompt 400b) to produce generated passage 116c in real-time (i.e., on demand).

In some examples, generated passage 116c is cached in a cache 510 for some time period, in the event that generated passage 116c is to be displayed for another viewer in the same viewer class as viewer 530, or viewer 530 sends another viewing request 504 fairly quickly. In such a scenario, viewer window 140 may pull generated passage 116c from cache 510, to save compute resources.

In some examples, prediction logic 508 makes a prediction that a viewing request 504 will be incoming in the near future, and so triggers viewer window 140 to produce generated passage 116c in anticipation of receiving viewing request 504. In some examples, various trigger conditions may be used to force a refresh of generated passage 116c within cache 510, such as a timer event, an update to one of data sources 102 (e.g., a new email, meeting, or document edit event), or LLM 124 may send a trigger.

Figure 6:
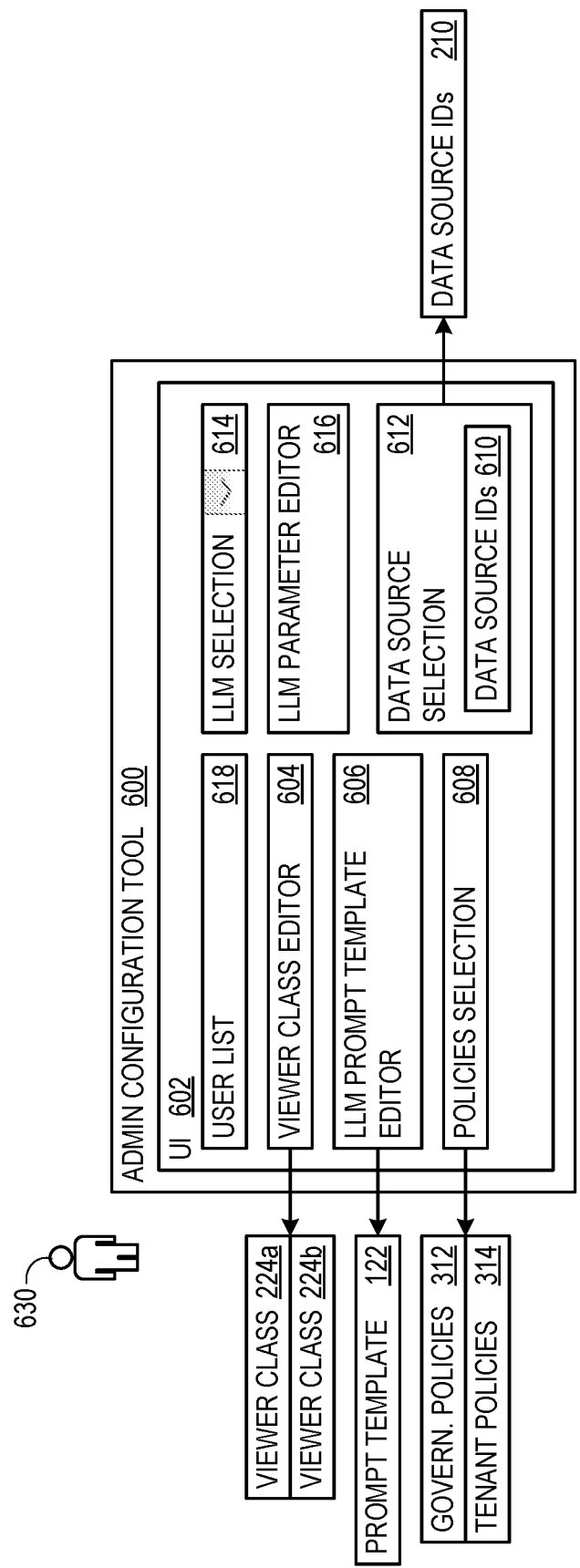
FIG. 6 illustrates an exemplary administrative configuration tool that may be used to configure the UI of FIGS. 2A and 2B.

FIG. 6 shows an example UI 602 of administrative configuration tool 600 that enables an administrative user 630 to configure parameters for data curation options 300, select the particular LLM to use, and prepare LLM prompt template 122. A user list selection 618 permits administrative user 630 to add users to architecture 100, such as data subject 230. A viewer class editor 604 defines viewer classes for viewer class selection window 222, such as viewer classes 224a and 224b. An LLM prompt template editor 606 enables construction of LLM prompts 400a and 400b, and a policies selection tool 608 enables administrative user 630 to define, define, and/or edit tenant policies 314 and governance policies 312. Different legal jurisdictions may have different privacy and security rules, so governance policies 312 may have variations based on the locality of data subject 230 (possibly as indicated by the IP address of a computer being used by data subject 230 to access UI 200). Additionally, different cultural norms may also drive locality variations in tenant policies 314.

A data source selection window 612 enables selection (down-selection) of set of data source identifications 210 from among a wider set of data source identifications 610 that are visible to administrative user 630. That is, administrative user 630 is able to select only those data sources in set of data source identifications 610 that fit within the policies of tenant 110 to include within set of data source identifications 210, from which data subject 230 may select. In this way, administrative user 630 sets boundaries by limiting sources and data subject 230 is able to tailor data curation options 300 (including selecting data sources and style/tone) within those boundaries. In some examples, UI 200 shows only data sources within set of data source identifications 210. In some examples, UI 200 also shows at least some data sources within set of data source identifications 610 that are also not within set of data source identifications 210, but greyed out or with some other display manner that prevents their selection by data subject 230 in UI 200.

An LLM selection widow 614 permits selection of LLM 124 from among a set of candidate LLMs, and an LLM parameter editor 616 sets LLM parameters for LLM 124. Examples of LLM parameters that may be set using LLM parameter editor 616 include temperature, frequency penalty, presence penalty, top p, and others.

Figure 7:
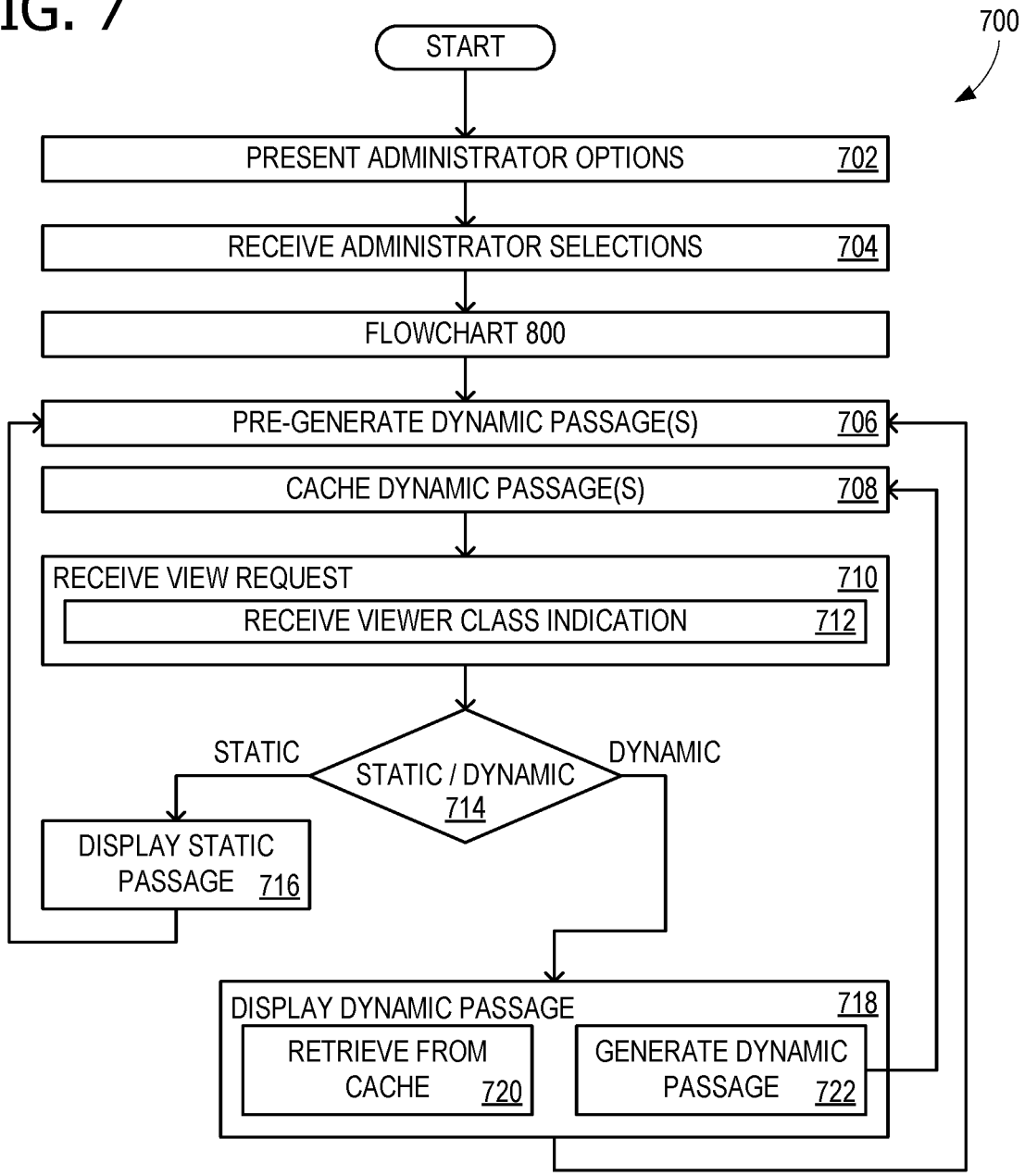
FIGS. 7, 8 and 9 show flowcharts illustrating exemplary operations that may be performed when using example architectures, such as the architecture of FIG. 1.

FIG. 7 shows a flowchart 700 illustrating exemplary operations that may be performed by architecture 100. In some examples, operations described for flowchart 700 are performed by computing device 1000 of FIG. 10. Flowchart 700 commences with presenting UI 602 to administrative user 630 in operation 702. Administrative user 630 uses UI 602 to select LLM 124, set LLM parameters, generate LLM prompt template 122, define set of data source identifications 210, and define viewer classes, in operation 704. Also, in operation 704, administrative user 630 uses UI 602 to restrict profile creation options (data curation options 300) by selecting governance policies 312 and tenant policies 314. That is, UI 602 receives restrictions on set of data source identifications 210 and/or set of data source selections 118a.

Flowchart 700 then diverts to flowchart 800 of FIG. 8, which is described below. Upon returning from completing flowchart 800, in some examples, operation 706 predicts the likelihood of receiving a viewing request from viewer class 224b (who will be shown a dynamically-generated LLM passage) and, based on at least meeting a threshold likelihood, operation 706 uses LLM 124 to generate (produce) generated passage 116c, using each data source identified as to be used in set of data source selections 118b. Operation 708 then caches generated passage 116c for a time period.

Viewing request 504 is received from viewer 530 (e.g., from internet browser 502 of viewer 530) in operation 710. In some examples, this includes receiving viewer class indication 524 in operation 712. Decision operation 714 determines whether viewer window 140 will display a stat or dynamic Generated passage, such as based on viewer class indication 524. If static, such as viewer class indication 524 indicating viewer class 224a, operation 716 displays generated passage 116a in UI 500, and flowchart 700 returns to operation 706.

If a dynamic view is to be provides, such as viewer class indication 524 indicating viewer class 224b, operation 718 displays generated passage 116c in UI 500. In some scenarios, operation 718 is performed by retrieving generated passage 116c from cache 510 in operation 720. In some scenarios, operation 718 is performed by LLM 124 generating generated passage 116c using each data source identified as to be used in set of data source selections 118b, in operation 722. In some examples, generated passage 116c is then stored in cache 510 (using operation 708). After operation 718, flowchart 700 returns to operation 706.

Figure 8:
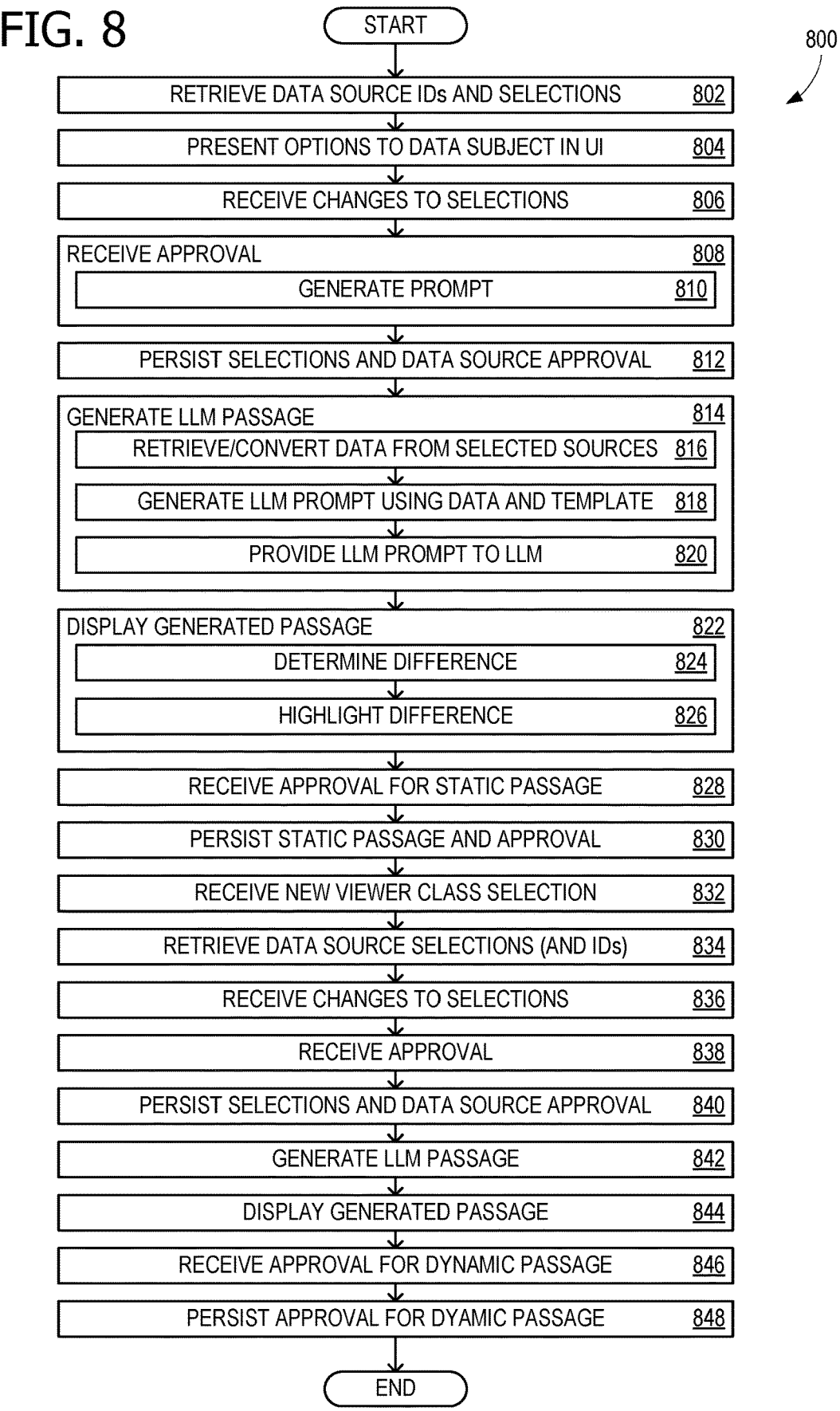

FIG. 8 shows a flowchart 800 illustrating exemplary operations that may be performed by architecture 100. In some examples, operations described for flowchart 800 are performed by computing device 1000 of FIG. 10. Flowchart 800 commences with preparing UI 200 for data subject 230 by retrieving set of data source identifications 210 and set of data source selections 118a (which is associated with viewer class 224a), in operation 802.

In operation 804, UI 200 presents set of data source identifications 210 and set of data source selections 118a to data subject 230 (the user). Each data source selection of set of data source selections 118a corresponds to a respective data source identification of set of data source identifications 210, and set of data source selections 118a indicates whether to use a data source identified by the corresponding data source identification. In some examples, UI 200 also presents viewer class selection window 222.

UI 200 receives changes, including change 250, to set of data source selections 118a in operation 806. In operation 808, UI 200 receives approval 261, from data subject 230, to generate generated passage 116a using set of data source selections 118a. In some examples, operation 808 includes operation 810, which generates user approval prompt 260 (possibly specific to the new use of a data source) upon receiving change 250. Operation 812 persists set of data source selections 118a and record 361 of approval 261.

Operation 814 uses LLM 124 to generate generated passage 116a using each data source identified as to be used in set of data source selections 118a, based on at least detecting (receiving) approval 261 in some examples. Operation 814 is performed using operations 816-820. Operation 816 retrieves data from each data source identified as to be used in set of data source selections 118a, which may involve converting the retrieved data. Operation 818 generates LLM prompt 400a, to have LLM instructions 402 and data 404 retrieved from each data source identified as to be used in set of data source selections 118a. Operation 820 provides LLM prompt 400a to LLM 124.

UI 200 displays generated passage 116a in operation 822, using operations 824 and 826 in some examples. Upon generating new generated passage 116d (see FIG. 2B), operation 824 determines a difference between new generated passage 116d and prior generated passage 116a, and operation 826 highlights the difference between new generated passage 116d and prior generated passage 116a in UI 200. In some examples, operation 822 comprises dynamically updating generated passage 116a in response to changes, such as change 250 (i.e., without requiring data subject 230 to click an update button).

Approval 263 by data subject 230 for generated passage 116a is received in operation 828, and operation 830 persists generated passage 116a and record 363 of approval 263.

Data subject 230 then proceeds to prepare a personal summary for another audience. UI 200 receives selection of viewer class 224b in operation 832 and retrieves set of data source selections 118b (associated with viewer class 224b) in operation 834. Some examples may change set of data source identifications 210 permitted for different viewer classes. UI 200 receives changes to set of data source selections 118b in operation 836 and approval 262 from data subject 230 to generate generated passage 116b using set of data source selections 118b, in operation 838. This may be similar to operation 808.

Operation 840 persists record 362 of approval 262, and operation 842 uses LLM 124 to generate generated passage 116b using each data source identified as to be used in set of data source selections 118b (e.g., based on at least detecting approval 262) This may be performed similarly to operation 814. Operation 844 displays generated passage 116b in UI 200, similarly to operation 822. In operation 846, UI 200 receives approval 264 by data subject 230 for generated passage 116b, and operation 848 persists record 364 of approval 264.

Figure 9:
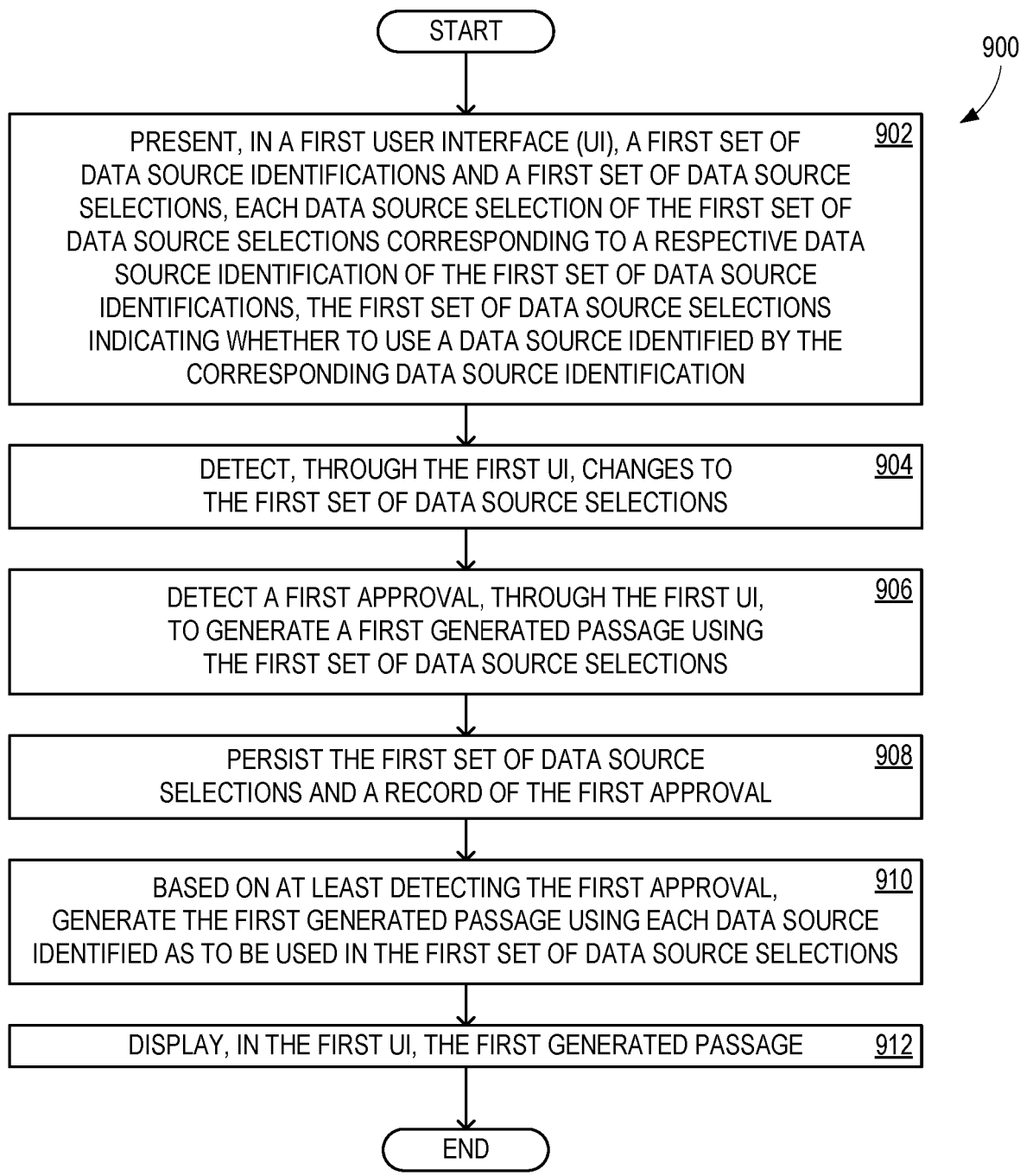

FIG. 9 shows a flowchart 900 illustrating exemplary operations that may be performed by architecture 100. In some examples, operations described for flowchart 900 are performed by computing device 1000 of FIG. 10. Flowchart 900 commences with operation 902, which includes presenting, in a first UI, a first set of data source identifications and a first set of data source selections, each data source selection of the first set of data source selections corresponding to a respective data source identification of the first set of data source identifications, the first set of data source selections indicating whether to use a data source identified by the corresponding data source identification.

Operation 904 includes detecting, through the first UI, changes to the first set of data source selections. Operation 906 includes detecting a first approval, through the first UI, to generate a first generated passage using the first set of data source selections. Operation 908 includes persisting the first set of data source selections and a record of the first approval. Operation 910 includes, based on at least detecting the first approval, generating the first generated passage using each data source identified as to be used in the first set of data source selections. Operation 912 includes displaying, in the first UI, the first generated passage.

Additional Examples

An example system comprises: a processor; and a computer-readable medium storing instructions that are operative upon execution by the processor to: present, in a first UI, a first set of data source identifications and a first set of data source selections, each data source selection of the first set of data source selections corresponding to a respective data source identification of the first set of data source identifications, the first set of data source selections indicating whether to use a data source identified by the corresponding data source identification; detect, through the first UI, changes to the first set of data source selections; detect a first approval, through the first UI, to generate a first generated passage using the first set of data source selections; persist the first set of data source selections and a record of the first approval; based on at least detecting the first approval, generate the first generated passage using each data source identified as to be used in the first set of data source selections; and display, in the first UI, the first generated passage.

An example computer-implemented method comprises: presenting, in a first UI, a first set of data source identifications and a first set of data source selections, each data source selection of the first set of data source selections corresponding to a respective data source identification of the first set of data source identifications, the first set of data source selections indicating whether to use a data source identified by the corresponding data source identification; detecting, through the first UI, changes to the first set of data source selections; detecting a first approval, through the first UI, to generate a first generated passage using the first set of data source selections; persisting the first set of data source selections and a record of the first approval; based on at least detecting the first approval, generating the first generated passage using each data source identified as to be used in the first set of data source selections; and displaying, in the first UI, the first generated passage.

One or more example computer storage devices have computer-executable instructions stored thereon, which, on execution by a computer, cause the computer to perform operations comprising: presenting, in a first UI, a first set of data source identifications and a first set of data source selections, each data source selection of the first set of data source selections corresponding to a respective data source identification of the first set of data source identifications, the first set of data source selections indicating whether to use a data source identified by the corresponding data source identification; detecting, through the first UI, changes to the first set of data source selections; detecting a first approval, through the first UI, to generate a first generated passage using the first set of data source selections; persisting the first set of data source selections and a record of the first approval; based on at least detecting the first approval, generating the first generated passage using each data source identified as to be used in the first set of data source selections; displaying, in the first UI, the first generated passage; persisting the first generated passage; presenting, in the first UI, a viewer class selection window, wherein the first set of data source selections is associated with a first viewer class and a second set of data source selections is associated with a second viewer class, each data source selection of the second set of data source selections corresponding to a respective data source identification of the first set of data source identifications, the second set of data source selections indicating whether to use a data source identified by the corresponding data source identification; detecting, through the first UI, changes to the second set of data source selections; detecting a second approval, through the first UI, to generate a second generated passage using the second set of data source selections; persisting a record of the second approval; based on at least detecting the second approval, generating, using the MM, the second generated passage using each data source identified as to be used in the second set of data source selections; and displaying, in the first UI, the second generated passage.

Alternatively, or in addition to the other examples described herein, examples include any combination of the following:

the MM comprises an LLM;

generating the first generated passage comprises retrieving data from each data source identified as to be used in the first set of data source selections;

generating the first generated passage comprises generating an MM prompt, the MM prompt including MM instructions and data retrieved from each data source identified as to be used in the first set of data source selections;

generating the first generated passage comprises providing the MM prompt to the MM;

detecting the first approval to generate the first generated passage using the first set of data source selections comprises, upon detecting a change indicating a new use of a data source, generating a user approval prompt specific to the new use;

presenting, in a second UI, at least one input option selected from the list consisting of: an MM prompt template editor, an MM selection widow, an MM parameter editor, and a data source selection widow;

the data source selection widow enabling selection of the first set of data source identifications from among a second set of data source identifications;

presenting, in the first UI, a viewer class selection window;

the first set of data source selections is associated with a first viewer class;

a second set of data source selections is associated with a second viewer class;

each data source selection of the second set of data source selections corresponds to a respective data source identification of the first set of data source identifications;

the second set of data source selections indicates whether to use a data source identified by the corresponding data source identification;

detecting, through the first UI, changes to the second set of data source selections;

detecting a second approval, through the first UI, to generate a second generated passage using the second set of data source selections;

persisting a record of the second approval;

based on at least detecting the second approval, generating, using the MM, the second generated passage using each data source identified as to be used in the second set of data source selections;

displaying, in the first UI, the second generated passage;

persisting the first generated passage;

receiving a viewing request from a viewer;

receiving, from the viewer, a viewer class indication;

based on at least the viewer class indication indicating the first viewer class, displaying, in a third UI, the first generated passage;

based on at least the viewer class indication indicating the second viewer class, generating, using the MM, a third generated passage using each data source identified as to be used in the second set of data source selections;

based on at least the viewer class indication indicating the second viewer class, displaying, in the third UI, the third generated passage;

based on at least predicting a threshold likelihood of receiving a viewing request from a viewer of the second viewer class, generating, using the MM, a third generated passage using each data source identified as to be used in the second set of data source selections;

based on at least predicting a threshold likelihood of receiving a viewing request from a viewer of the second viewer class, caching the third generated passage for a time period;

based on at least receiving the viewing request from the viewer of the second viewer class, displaying, in the third UI, the third generated passage;

upon generating a new generated passage in the first UI, determining a difference between the new generated passage and a prior generated passage;

highlighting, in the first UI, the difference between the new generated passage and the prior generated passage;

defining a viewer class;

retrieving the first set of data source identifications for the user;

retrieving the first set of data source selections;

detecting a third approval by the user for the first generated passage;

persisting a record of the third approval;

detecting, through the first UI, selection of the second viewer class;
retrieving the second set of data source selections;
detecting a fourth approval by the user for the second generated passage;
persisting a record of the fourth approval;
retrieving data from a data source comprises converting retrieved data;
based on at least predicting a threshold likelihood of receiving a viewing request from a viewer of the second viewer class, generating, using the MM, a third generated passage using each data source identified as to be used in the second set of data source selections; and
caching the third generated passage for a time period.

While the aspects of the disclosure have been described in terms of various examples with their associated operations, a person skilled in the art would appreciate that a combination of operations from any number of different examples is also within scope of the aspects of the disclosure.

Example Operating Environment

Figure 10:
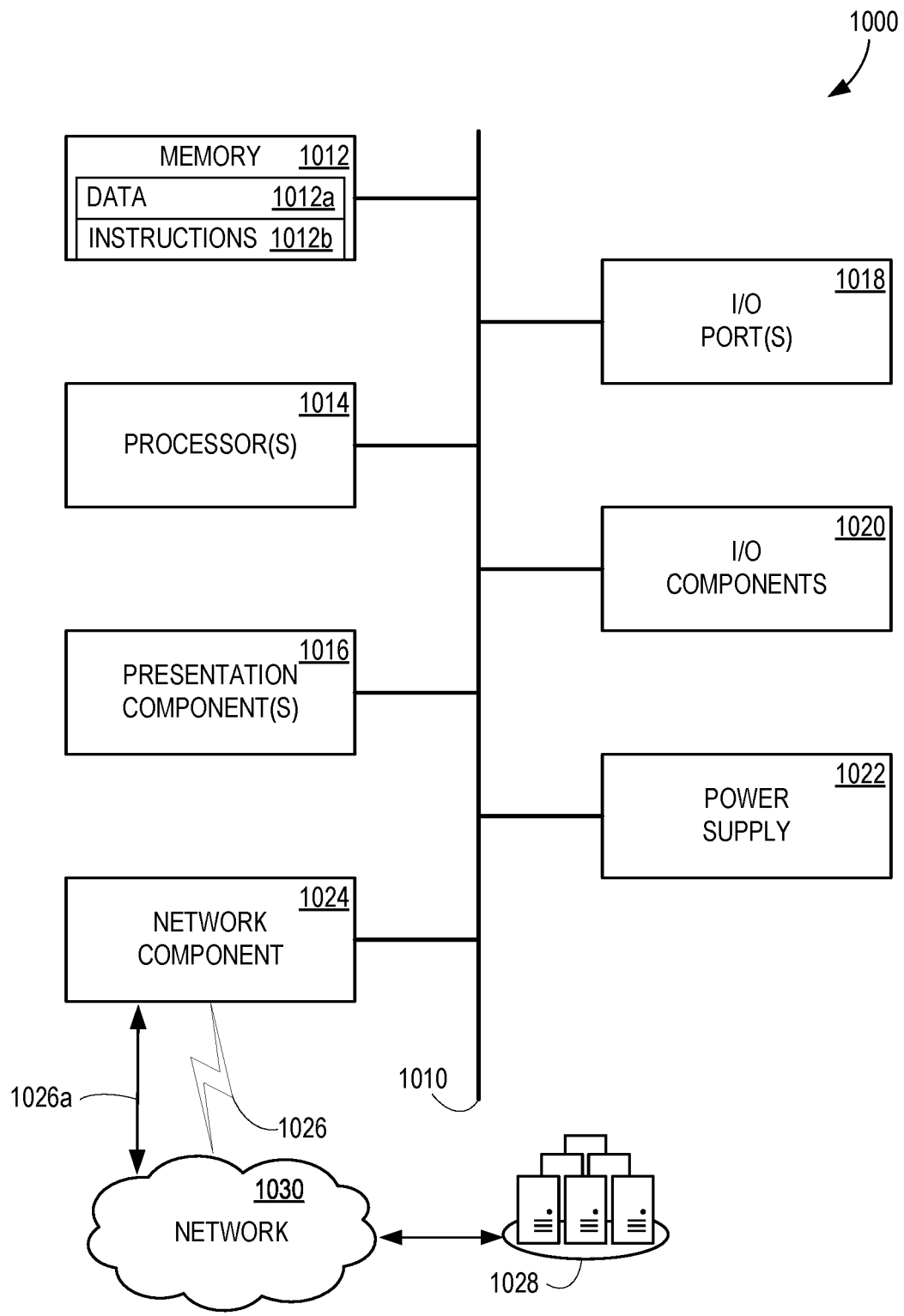
FIG. 10 shows a block diagram of an example computing device suitable for implementing some of the various examples disclosed herein.

FIG. 10 is a block diagram of an example computing device 1000 (e.g., a computer storage device) for implementing aspects disclosed herein, and is designated generally as computing device 1000. In some examples, one or more computing devices 1000 are provided for an on-premises computing solution. In some examples, one or more computing devices 1000 are provided as a cloud computing solution. In some examples, a combination of on-premises and cloud computing solutions are used. Computing device 1000 is but one example of a suitable computing environment and is not intended to suggest any limitation as to the scope of use or functionality of the examples disclosed herein, whether used singly or as part of a larger set.

Neither should computing device 1000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1000 includes a bus 1010 that directly or indirectly couples the following devices: computer storage memory 1012, one or more processors 1014, one or more presentation components 1016, input/output (I/O) ports 1018, I/O components 1020, a power supply 1022, and a network component 1024. While computing device 1000 is depicted as a seemingly single device, multiple computing devices 1000 may work together and share the depicted device resources. For example, memory 1012 may be distributed across multiple devices, and processor(s) 1014 may be housed with different devices.

Bus 1010 represents what may be one or more buses (such as an address bus, data bus, or a combination thereof).

Although the various blocks of FIG. 10 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 10 and the references herein to a "computing device." Memory 1012 may take the form of the computer storage media referenced below and operatively provide storage of computer-readable instructions, data structures, program modules and other data for the computing device 1000. In some examples, memory 1012 stores one or more of an operating system, a universal application platform, or other program modules and program data. Memory 1012 is thus able to store and access data 1012a and instructions 1012b that are executable by processor 1014 and configured to carry out the various operations disclosed herein. Thus, computing device 1000 comprises a computer storage device having computer-executable instructions 1012b stored thereon.

In some examples, memory 1012 includes computer storage media. Memory 1012 may include any quantity of memory associated with or accessible by the computing device 1000. Memory 1012 may be internal to the computing device 1000 (as shown in FIG. 10), external to the computing device 1000 (not shown), or both (not shown). Additionally, or alternatively, the memory 1012 may be distributed across multiple computing devices 1000, for example, in a virtualized environment in which instruction processing is carried out on multiple computing devices 1000. For the purposes of this disclosure, "computer storage media," "computer storage memory," "memory," and "memory devices" are synonymous terms for the memory 1012, and none of these terms include carrier waves or propagating signaling.

Processor(s) 1014 may include any quantity of processing units that read data from various entities, such as memory 1012 or I/O components 1020. Specifically, processor(s) 1014 are programmed to execute computer-executable instructions for implementing aspects of the disclosure. The instructions may be performed by the processor, by multiple processors within the computing device 1000, or by a processor external to the client computing device 1000. In some examples, the processor(s) 1014 are programmed to execute instructions such as those illustrated in the flow charts discussed below and depicted in the accompanying drawings. Moreover, in some examples, the processor(s) 1014 represents an implementation of analog techniques to perform the operations described herein. For example, the operations may be performed by an analog client computing device 1000 and/or a digital client computing device 1000. Presentation component(s) 1016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways. I/O ports 1018 allow computing device 1000 to be logically coupled to other devices including I/O components 1020, some of which may be built in. Example I/O components 1020 include, for example but without limitation, a microphone, joystick, game pad, satellite dish, scanner, printer, wireless device, etc.

Computing device 1000 may operate in a networked environment via the network component 1024 using logical connections to one or more remote computers. In some examples, the network component 1024 includes a network interface card and/or computer-executable instructions (e.g., a driver) for operating the network interface card. Communication between the computing device 1000 and other devices may occur using any protocol or mechanism over any wired or wireless connection. In some examples, network component 1024 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1024 communicates over wireless communication link 1026 and/or a wired communication link 1026a to a remote resource 1028 (e.g., a cloud resource) across network 1030. Various different examples of communication links 1026 and 1026a include a wireless connection, a wired connection, and/or a dedicated link, and in some examples, at least a portion is routed through the internet.

Although described in connection with an example computing device 1000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a non-transitory computer-readable medium storing instructions that are operative upon execution by the processor to:
present, in a first user interface (UI), a first set of data source identifications and a first set of data source selections, each data source selection of the first set of data source selections corresponding to a respective data source identification of the first set of data source identifications, the first set of data source selections indicating whether to use a data source identified by the corresponding data source identification;

detect, through the first UI, a change to the first set of data source selections;

detect a first approval, through the first UI, to generate a first generated passage using the first set of data source selections;

persist the first set of data source selections and a record of the first approval;

based on at least detecting the first approval, generate the first generated passage using each data source identified as to be used in the first set of data source selections, wherein generating the first generated passage comprises:

retrieving data from each data source identified as to be used in the first set of data source selections;

generating a multimodal model (MM) prompt including MM instructions and data retrieved from each data source identified as to be used in the first set of data source selections; and providing the MM prompt to an MM;

in response to receiving the first generated passage from the MM based on the provided MM prompt, display, in the first UI, the first generated passage;

present, in the first UI, a viewer class selection window, wherein the first set of data source selections is associated with a first viewer class and a second set of data source selections is associated with a second viewer class, each data source selection of the second set of data source selections corresponding to a respective data source identification of the first set of data source identifications, the second set of data source selections indicating whether to use a data source identified by the corresponding data source identification;

detect, through the first UI, changes to the second set of data source selections;

detect a second approval, through the first UI, to generate a second generated passage using the second set of data source selections;

persist a record of the second approval;

based on at least detecting the second approval, generate the second generated passage using each data source identified as to be used in the second set of data source selections;

display, in the first UI, the second generated passage;

in response to detecting an update to at least one data source associated with the first set of data source selections, refresh the first generated passage; and in response to detecting an update to at least one data source associated with the second set of data source selections, refresh the second generated passage.

2. The system of claim 1, wherein the instructions are further operative to:

dynamically update the first generated passage in response to detecting the change to the first set of data source selections.

3. The system of claim 1, wherein detecting the first approval to generate the first generated passage using the first set of data source selections comprises:

upon detecting a change indicating a new use of a data source, generating a user approval prompt specific to the new use.

4. The system of claim 1, wherein the instructions are further operative to:

receive, in a second UI, restrictions on the first set of data source identifications and/or the first set of data source selections.

5. The system of claim 1, wherein the instructions are further operative to:

persist the first generated passage;

receive a viewing request from a viewer;

receive, from the viewer, a viewer class indication;

based on at least the viewer class indication indicating the first viewer class, display, in a third UI, the first generated passage;

based on at least the viewer class indication indicating the second viewer class:

generate a third generated passage using each data source identified as to be used in the second set of data source selections; and display, in the third UI, the third generated passage.

6. The system of claim 1, wherein the instructions are further operative to:

based on at least predicting a threshold likelihood of receiving a viewing request from a viewer of the second viewer class:

generate a third generated passage using each data source identified as to be used in the second set of data source selections; and cache the third generated passage for a time period; and based on at least receiving the viewing request from the viewer of the second viewer class:

display, in a third UI, the third generated passage.

7. The system of claim 1, wherein the instructions are further operative to:

upon generating a new generated passage in the first UI, determine a difference between the new generated passage and a prior generated passage; and highlight, in the first UI, the difference between the new generated passage and the prior generated passage.

8. A computer-implemented method comprising:

presenting, in a first user interface (UI), a first set of data source identifications and a first set of data source selections, each data source selection of the first set of data source selections corresponding to a respective data source identification of the first set of data source identifications, the first set of data source selections indicating whether to use a data source identified by the corresponding data source identification;

detecting, through the first UI, changes to the first set of data source selections;

detecting a first approval, through the first UI, to generate a first generated passage using the first set of data source selections;

persisting the first set of data source selections and a record of the first approval;

based on at least detecting the first approval, generating the first generated passage using each data source identified as to be used in the first set of data source selections, wherein generating the first generated passage comprises:

retrieving data from each data source identified as to be used in the first set of data source selections;

generating a multimodal model (MM) prompt including MM instructions and data retrieved from each data source identified as to be used in the first set of data source selections;

providing the MM prompt to an MM; and displaying, in the first UI, the first generated passage; and presenting, in the first UI, a viewer class selection window, wherein the first set of data source selections is associated with a first viewer class and a second set of data source selections is associated with a second viewer class, each data source selection of the second set of data source selections corresponding to a respective data source identification of the first set of data source identifications, the second set of data source selections indicating whether to use a data source identified by the corresponding data source identification;

detecting, through the first UI, changes to the second set of data source selections;

detecting a second approval, through the first UI, to generate a second generated passage using the second set of data source selections;

persisting a record of the second approval;

based on at least detecting the second approval, generating the second generated passage using each data source identified as to be used in the second set of data source selections;

displaying, in the first UI, the second generated passage;

in response to detecting an update to at least one data source associated with the first set of data source selections, refreshing the first generated passage; and in response to detecting an update to at least one data source associated with the second set of data source selections, refreshing the second generated passage.

9. The computer-implemented method of claim 8, further comprising:

dynamically updating the first generated passage in response to detecting the change to the first set of data source selections.

10. The computer-implemented method of claim 8, wherein detecting the first approval to generate the first generated passage using the first set of data source selections comprises:

upon detecting a change indicating a new use of a data source, generating a user approval prompt specific to the new use.

11. The computer-implemented method of claim 8, further comprising:

receiving, in a second UI, restrictions on the first set of data source identifications and/or the first set of data source selections.

12. The computer-implemented method of claim 8, further comprising:

persisting the first generated passage;

receiving a viewing request from a viewer;

receiving, from the viewer, a viewer class indication;

based on at least the viewer class indication indicating the first viewer class, displaying, in a third UI, the first generated passage;

based on at least the viewer class indication indicating the second viewer class:

generating a third generated passage using each data source identified as to be used in the second set of data source selections; and displaying, in the third UI, the third generated passage.

13. The computer-implemented method of claim 8, further comprising:

based on at least predicting a threshold likelihood of receiving a viewing request from a viewer of the second viewer class:

generating a third generated passage using each data source identified as to be used in the second set of data source selections; and caching the third generated passage for a time period; and based on at least receiving the viewing request from the viewer of the second viewer class:

displaying, in a third UI, the third generated passage.

14. The computer-implemented method of claim 8, further comprising:

upon generating a new generated passage in the first UI, determining a difference between the new generated prior generated passage; and highlighting, in the first passage and a UI, the difference between the new generated passage and the prior generated passage.

15. A non-transitory computer storage device having computer-executable instructions stored thereon, which, on execution by a computer, cause the computer to perform operations comprising:

presenting, in a first user interface (UI), a first set of data source identifications and a first set of data source selections, each data source selection of the first set of data source selections corresponding to a respective data source identification of the first set of data source identifications, the first set of data source selections indicating whether to use a data source identified by the corresponding data source identification;

detecting, through the first UI, changes to detecting a first approval, through the first UI, to generate a first generated passage using the first set of data source selections;

persisting the first set of data source selections and a record of the first approval;

based on at least detecting the first approval, generating the first generated passage using each data source identified as to be used in the first set of data source selections, wherein generating the first generated passage comprises:

retrieving data from each data source identified as to be used in the first set of data source selections;

generating a multimodal model (MM) prompt including MM instructions and data retrieved from each data source identified as to be used in the first set of data source selections; and providing the MM prompt to an MM;

displaying, in the first UI, the first generated passage;

persisting the first generated passage;

presenting, in the first UI, a viewer class selection window, wherein the first set of data source selections is associated with a first viewer class and a second set of data source selections is associated with a second viewer class, each data source selection of the second set of data source selections corresponding to a respective data source identification of the first set of data source identifications, the second set of data source selections indicating whether to use a data source identified by the corresponding data source identification;

detecting, through the first UI, changes to the second set of data source selections;

detecting a second approval, through the first UI, to generate a second generated passage using the second set of data source selections;

persisting a record of the second approval;

based on at least detecting the second approval, generating the second generated passage using each data source identified as to be used in the second set of data source selections; and displaying, in the first UI, the second generated passage.

16. The computer storage device of claim 15, wherein the operations further comprise:

based on at least predicting a threshold likelihood of receiving a viewing request from a viewer of the second viewer class:
generating a third generated passage using each data source identified as to be used in the second set of data source selections; and
caching the third generated passage for a time period; and
based on at least receiving the viewing request from the viewer of the second viewer class:
displaying, in a third UI, the third generated passage.

17. The computer storage device of claim 15, wherein the operations further comprise:
dynamically updating the first generated passage in response to detecting the change to the first set of data source selections.

18. The computer storage device of claim 15, wherein the operations further comprise:
detecting a third approval by the user for the first generated passage;
persisting a record of the third approval;
detecting, through the first UI, selection of the second viewer class;
detecting a fourth approval by the user for the second generated passage; and
persisting a record of the fourth approval.

* * * * *